3,530,137
CERTAIN ALKYL AND ARYL ETHERS AND THIOETHERS OF TROPINE AND DERIVATIVES THEREOF
Karoly Nador, Gabor Kraiss, Lajos Gyorgy, Jeno Molnar, Margit Doda, Eva Galambos, and Klara Pfeifer, Budapest, Hungary, assignors to Chinoin Gyogyszer es Vegyeszeti Termekek Gyara RT., Budapest, Hungary, a firm
No Drawing. Filed Sept. 19, 1967, Ser. No. 668,947
Claims priority, application Hungary, Sept. 20, 1966, CI-661
Int. Cl. C07d 43/06
U.S. Cl. 260—292      4 Claims

ABSTRACT OF THE DISCLOSURE

New tropine-ethers having the general formula

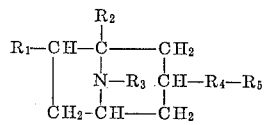

and pharmaceutically acceptable addition salts thereof and lower alkyl quaternary salts thereof containing 1–4 carbon atoms, wherein such general formula $R_1$ stands for hydrogen or a lower alkoxy group;
$R_2$ stands for hydrogen;
$R_3$ stands for a hydrocarbon radical containing not more than 4 carbon atoms;
$R_4$ stands for oxygen or sulphur;
$R_5$ stands for alkyl groups containing 1–4 carbon atoms and up to two phenyl groups.

---

This invention relates to new tropine ethers. More particularly it is concerned with new tropine-ethers, a process for the preparation thereof and pharmaceutical compositions containing said compounds.

According to a feature of the present invention there are provided new tropine-ethers of the general formula

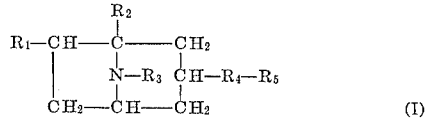

pharmaceutically acceptable addition salts thereof and lower alkyl quaternary salts thereof containing 1–4 carbon atoms,
wherein $R_1$ stands for hydrogen or a lower alkoxy group;
$R_2$ stands for hydrogen;
$R_3$ stands for a hydrocarbon radical containing not more than 4 carbon atoms;
$R_4$ stands for oxygen or sulphur;
$R_5$ stands for alkyl groups containing 1–4 carbon atoms and up to two phenyl groups.

As a suitable value for $R_1$ when it stands for a lower alkoxy group, there may be mentioned such groups containing 1–4 carbon atoms, such as methoxy or ethoxy.

As a suitable value for $R_3$ there may be mentioned straight or branched chained hydrocarbon radicals containing not more than 4 carbon atoms, such as methyl, ethyl, propyl and butyl.

As a suitable value for $R_5$ when it stands for an alkyl group, there may be mentioned such groups containing 1–4 carbon atoms such as methyl, ethyl, n-propyl, isobutyl etc.

$R_5$ may also represent an aromatic group. Said aromatic group may also be a condensed ring, consisting preferably of two phenyl groups. The aromatic group may bear one or more substituents selected from the following groups: lower alkyl (such as methyl, ethyl, butyl), halogen (chlorine, bromine, iodine and fluorine), trifluoromethyl, lower alkoxy (such as methoxy, ethoxy, etc.), hydroxy, carbalkoxy groups containing not more than 4 carbon atoms (such as carbmethoxy, carbethoxy, etc.), amino, substituted amino (such as dimethylamino) and nitro. The substituents may be attached to any position of the aromatic ring and the position of the different substituents related to each other may also be arbitrary.

The salts of the compounds of the general Formula I may be those formed with pharmaceutically acceptable acids. The sals may be formed with inorganic acids (such as hydrohalogenic acids, e.g. hydrochloric acid, hydrobromic acid, sulphuric acid, phosphoric acid, nitric acid) and with organic acids (such as lactic acid, acetic acid, maleic acid, tartaric acid, citric acid etc.).

The quaternary salts may be formed with alkyl halogenides, preferably with lower alkyl halogenides, such as methyl iodide, ethyl chloride etc.

Particularly preferable representatives of the tropine ethers of the general Formula I are the following compounds:

tropine-methyl-ether,
tropine-n-butyl-ether,
tropine-phenyl-ether,
tropine-thiophenyl-ether,
N-isopropyl-nortropine-phenyl-ether,
6-methoxy-tropine-phenyl-ether,
tropine-(3-cresyl)-ether,
tropine-(3,5-dimethyl-phenyl)-ether,
tropine-(4-chloro-phenyl)-ether,
tropine-(3-trifluoro-methyl-phenyl)-ether,
tropine-(2,4-dichloro-phenyl)-ether,
tropine-(3,4-dichloro-phenyl)-ether,
tropine-pentachloro-phenyl-ether,
tropine-(4-chloro-3,5-dimethyl-phenyl)-ether,
tropine-(3-methyl-4-chlorophenyl)-ether,
tropine-4-nitro-phenyl-ether,
tropine-(4'-benzyl-oxy)-phenyl-ether,
tropine-(3,5-dichloro-phenyl)-ether,
tropine-(3,4,5-trimethyl-phenyl)-ether,
tropine-(4-tertiary-butyl)-phenyl-ether,
pharmaceutically acceptable acid addition salts and lower alkyl quaternary salts containing 1–4 carbon atoms of said compounds (e.g. formed with methyl-bromide).

According to a further feature of the present invention there is provided a process for the preparation of the new compounds of the general Formula I which comprises reacting a tropine-sulphonic acid-ester of the general Formula II

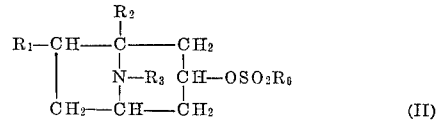

(wherein $R_1$, $R_2$ and $R_3$ have the same meaning as stated above and $R_6$ stands for a lower alkyl or an aryl group) with compounds of the general formula $$R_5—R_4—Me \qquad (III)$$

wherein $R_4$ and $R_5$ have the same meaning as stated above, and Me represents an alkali metal.

As a suitable value for $R_6$ when it stands for a lower alkyl group there may be mentioned such groups containing 1–4 carbon atoms (such as methyl, ethyl or butyl). As a suitable value for $R_6$ when it stands for an aryl group, there may be mentioned the phenyl-group or substituted phenyl-group, such as p-tolyl, etc.

The compounds of the general Formula III may be alcoholates, phenoxides, thioalcoholates and thiophenoxides, depending on the meaning of $R_5$ and $R_4$. Me represents preferably sodium or potassium.

The reaction is carried out preferably in a polar solvent. If the compound of the Formula III is a phenolate, one may use preferably dimethylformamide, while if the compound of the Formula III is an alcoholate, the excess of the corresponding alcohol may act as solvent. The reaction is accomplished preferably at a temperature in the range of 40–100° C. The alcoholate and the phenolate may be advantageously used in an excess. The reaction-time depends on the reactants and the temperature applied and amounts generally to 2–4 hours.

The reaction mixture may be worked up according to different methods depending on the reactants and the solvents used. One may proceed by filtering off the sulphonic acid salt of the formula $R_5—SO_3—Me$, acidifying the filtrate and evaporating same to dryness in vacuo. The residue obtained is taken up in water and the unreacted phenol is removed by extraction with a water non-miscible solvent In some cases the salt of the tropine-ether precipitates and may be isolated by filtration The acidic-aqueous solution is made alkaline with a 40% alkali-hydroxide solution to the pH-value of 8.5–9 while cooling with ice- and the precipitated oily tropine-ether-base is isolated by means of solvent-extraction On evaporating the solvent the crude tropine-ether-base is obtained which is then purified by vacuum distillation The free base thus obtained may be converted into acid-addition salts with the corresponding acids or into quaternary salts by using alkyl-halogenids The new tropine-ethers of the general Formula I thus obtained are strong bases, which may be transformed into acid addition salts Any pharmaceutically acceptable mineral or organic acid may be used for salt-formation, such as hydrochloric acid, hydrobromic acid, sulphuric acid, nitric acid, phosphoric acid, lactic acid, acetic acid, maleic acid, tartaric acid, citric acid, fumaric acid, p-toluene-sulphonic acid etc. The acid addition salts crystallize readily and are excellently or fairly soluble in water.

The tropine-ethers of the general Formula I may also be transformed into their quaternary salts. One may proceed preferably by dissolving the tropine-ether in a polar solvent (e.g. in acetone) and reacting the solution with an excess of a lower alkyl-halogenide in a pressure-tube at a temperature of about 100° C. The quaternary salt formed may be recovered by usual methods.

The tropine-ethers are very poorly described in scientific and patent literature, especially when we compare the relating literature to that of other tropine derivatives. Regarding the alkyl-ethers of tropine, the tropine-methyl-ether is described in German Pat. 106,492. According to our physicochemical experiments and considering the disclosure of U.S. Pat. 2,595,405 the compound disclosed in the above German patent is no O-methyl, but an N-methyl derivative, consequently this compound is a quaternary one. The infrared spectrum unambiguously substantiates this fact. In addition there is only one compound group relating to tropine-ethers, but these compounds are only the benzhydril-ethers of tropine and derivatives thereof bearing various substituents on one or both aromatic rings of the benzhydryl. Such compounds are set forth in U.S. Pats. 2,595,405, 2,706,198, 2,782,820, in British Pats. 824,875 and 769,282, in Belgian Pat. 515,-227 and German Pats. 1,077,223, 1,020,634 and 1,090,672. According to said patents even the preparation of the benzhydryl-ethers differs significantly from the process of the present invention because tropine or a substituted derivative thereof is reacted with benzhydryl-halogenides or substituted benzhydryl-halogenides in the presence of acid-binding agents. The basis of the process according to the present invention directed e.g. to the preparation of the particularly interesting tropine-aryl-ethers resides in the recognition that tropine is not able to react with a reactant containing mobile halogen because the halogen directly attached to the aromatic nucleus is not reactive and it can get into interaction with the tropine only under such vigorous conditions which would cause the decomposition of the tropine-molecule. Moreover the benzhydryl ethers of tropine are quite specific compounds, which possess particular properties; other compounds containing mobile halogen react with tropine by forming a quaternary salt, while no ether-formation takes place.

The significance of the present invention resides on the one hand in the fact that it provides a hitherto unknown process for the preparation of basic ethers, particularly of tropine-ethers, which process may be widely and generally used in organic chemisty.

On the other hand the compounds of the general Formula I, particularly the aryl-ethers possess very effective and unexpected pharmacological properties. Thus, the tropine-phenyl-ether (Example 3) exhibits very strong psychostimulant, tryamine antagonizing, nor-adrenaline potentiating and "anti-Tetrabenazine" effect. This compound increases the spontaneous motility on mice by 200–250% when administered in a dose of 3–5 mg./kg. A 3 mg./kg. dose of the product antagonizes the depressive effect and the Tetrabenazin-Ptosis in dose of 25–35 mg. of Tetrabenazine ®. If administered in a dose of 1.5 mg./kg. it increases the sympaticomimetic effect of 5–10 μg. of nor-adrenaline and inhibits the sympaticomimetic effect of 0.2–0.5 mg./kg. of tyramine, tested on the blood-pressure of dogs and cats, on the nictitating membrane of cats and on dog-heart. The toxical dose is ten times higher than the effective dose. Toxicity: 49 mg./kg. s.c. and 18 mg./kg. i.v. (on mice) The above effects of tropine-p-chloro-phenyl-ether are weaker but this compound antagonises the muscle-relaxing effect of 0.5 mg./kg. of Oxotremorine and it inhibits expressively the lethal effect of intravenously injected nicotine, if administered in a dose of 5 mg./kg. The toxical dose of this compound is about fifty times higher than the effective dose. Toxicity on mice is 101 mg./kg., when administered subcutaneously. This product seems to be suitable for the treatment of the Parkinson-disease due to its above properties.

One derivative of the starting materials of the general Formula II namely the tropine-methane-sulphonate ($R_1=R_2=H$ and $R_3=R_6=CH_3$) has been described in literature (J. Am. Chem. Soc., 1958, 80, 4677). The other tropane sulphonic-acid esters are new compounds and may be prepared by methods known per se.

According to a further feature of the present invention there are provided pharmaceutical compositions comprising at least one compound of the general Formula I. or acid-addition salts or quaternary salts thereof as active ingredient and pharmaceutically acceptable inert diluents and/or excipients. Said pharmaceutical compositions may be administered orally or parenterally. Thus said pharmaceutical compositions may be in the form of tablets, coated pills, powder mixtures, solutions, emulsions, suspensions, or injectable aqueous or oily solutions.

Suitable tablets may be formulated by admixture of the active ingredient(s) with known pharmaceutical excipients, for example inert diluents, for example calcium carbonate, calcium phosphate or lactose, disintegrating agents, for example maize starch or alginic acid, binding agents, for example starch, gelatine or acacia mucilage, and lubricating agents, for example magnesium stearate, stearic acid or talc. Such tablets may optionally be coated by known techniques in order to delay disintegration in the stomach and thus to provide a sustained action over an extended period.

The aqueous suspensions, emulsions, oily solutions and suspensions of the invention generally contain a sweetening agent, for example glycerol, dextrose or sucrose, and a flavouring agent, for example vanillin or orange extract, in order to provide a palatable product. The aqueous suspensions of the invention may also contain suitable suspending or thickening agents, for example a sodium carboxymethylcellulose, wetting agents, for example condensation products of fatty alcohols with ethylene oxide, and preservatives, for example methyl or propyl p-hydroxybenzoate.

The emulsions of the invention may contain the active ingredient(s) dissolved in an oil of vegetable or animal origin, for example arachis oil or cod liver oil, and may also contain sweetening agents and flavouring agents which may with advantage be essential oils. The said emulsions may also contain emulsifying agents and dispersing agents, for example soya bean, lecithin, polyoxyethylene sorbitan monooleate, gum acacia, gum tragacanth or casein and preservatives, for example methyl or propyl p-hydroxy-benzoate, and anti-oxidants, for example propyl gallate.

The oily solutions of the invention likewise contain the active ingredient(s) in solution in an oil of vegetable or animal origin, and may optionally contain flavouring agents to mask the taste and improve oral acceptability. Such oily solutions may advantageously be filled into soft gelatin capsules. The oily solutions may also contain sweetening agents, for example icing sugar, in which case the oil phase may in addition contain a suspending agent, for example beeswax, to maintain the redispersion properties of the suspension.

Oral compositions in the form of gelatine capsules may contain the active ingredient(s) alone or in admixture with inert diluents, for example, lactose or sorbitol.

The sterile injectable aqueous suspensions of the invention may contain a suspending or thickening agent, for example sodium carboxymethylcellulose, and a wetting or dispersing agent, for example a phenolpolyethylene oxide condensate, for example a condensation product of octylcresol with about 8–10 molecular proportions of ethylene oxide. The sterile injectable oily solutions of the invention may be prepared from non-toxic injectable oil, for example arachis oil or ethyl oleate, and they may additionally contain a gelling agent, for example aluminium stearate, to delay absorption within the body. These sterile aqueous or oily injectable preparations may contain preservatives such as methyl- or n-propyl p-hydroxybenzoate.

Further details of our process are to be found in the examples. It is however by no means intended to limit the scope of the invention to the specific examples, which serve only for illustration. The melting points are not corrected values and they have been determined by heating the sample with a velocity of 10° C./minute.

The structure of the products is determined by analysis data encompassing almost every element present and the results are often completed by direct oxygen-determination and infrared spectrum. In the case of tropine-3-phenylether also the NMR-spectrum is disclosed.

EXAMPLE 1

6.9 g. of sodium are dissolved in 200 ml. of anhydrous methanol whereupon a solution of 43.8 g. of tropine-methane-sulphonate and 300 ml. of methanol are added. The solution is refluxed for 3 hours. The precipitated sodium-methane-sulphonate (21.4 g.) is filtered off, the methanolic solution is acidified with 20 ml. of concentrated hydrochloric acid and the mixture is evaporated to dryness in vacuo. The residue is dissolved in 130 ml. of water, the mixture is made alkaline with 50 g. of potassium carbonate and extracted with 200 ml. of ether in several portions. The ether-layer is dried over sodium-sulphate, the solvent is removed and the residue is distilled off in vacuo. The boiling point of the tropine-methyl-ether thus obtained amounts to 90–93° C./17 mm. Hg. $n_D^{20}=1.4780$. Analysis: percent N=9.31. (calc. 9.03). The melting point of the reineckate salt of the methyl ether amounts to 188–189° C., while that of the hydrochloride was found to be 233–235° C. (after recrystallization from ethanol).

Analysis. (percent).—Calc. for C, 56.39; H, 9.47; N, 7.31; Cl, 18.49. Found (percent): C, 56.66; H, 9.56; N, 7.15; Cl, 18.41.

EXAMPLE 2

The tropine-n-butyl-ether may be prepared according to the process described in Example 1 except that 200 and 250 ml. of anhydrous butanol are used as solvent. The reaction mixture is worked up as disclosed in Example 1. The boiling point of the tropine-n-butyl-ether amounts to 138–142° C./24 mm. Hg. $n_D^{20}=1.4708$.

Analysis.—Calc. (percent): C, 73.05; H, 11.75; N, 7.10. Found (percent): C, 73.2; H, 11.35; N, 7.29.

The p-toluene-sulphonate of the product is prepared by usual methods. M.P. 161.5–162° C. (after recrystallization from a mixture of ethanol and ether). The melting point of the reineckate amounts to 170–173° C. (after crystallization from aqueous acetone).

EXAMPLE 3

The tropine-phenyl-ether may be prepared as follows: 36.0 g. of sodium-phenolate (which has been previously made free of water by means of repeated azeotropic distillation with benzene) are taken up in 250 ml. of dimethylformamide, whereupon a solution of 65.7 g. of tropine-methane-sulphonate and 350 ml. of dimethylformamide is added. The mixture is heated on a water bath for 3 hours whereupon the precipitated sodium-methane-sulphonate is filtered off, the filtrate is acidified with 40 ml. of a 1:1 diluted aqueous hydrochloric acid solution and evaporated to dryness in vacuo. The residue is taken up in 200 ml. of water, whereupon the neutral substances are extracted three times with 50 ml. ether each. The solution is made alkaline with 75 g. of potassium carbonate under cooling, whereupon the tropine-phenyl ether formed is extracted four times with 100 ml. ether each. The ether-solution is worked up according to usual methods and the residue is fractionated in vacuo. As fore-run trop-2-ene is obtained. The tropine-phenyl-ether distilles off as a colourless oil at 135° C./1.5 mm. Hg. Yield: 24.5 g., $n_D^{20}=1.5477$. On some hours of standing the oil becomes crystalline. The melting point of the product amounts to 50–51° C. after recrystallization from petroleum ether. The hydrochloride of the product may be prepared by dissolving the base in methanol and neutralizing the solution with anhydrous ether containing hydrochloric acid. The hydrochloride may be recrystallized from methanol, M.P. 270.5–272° C. (decomposition).

Analysis.—Calc. (percent): C, 66.26; H, 7.94; N, 5.52. Found (percent): C, 66.32; H, 8.16; N, 5.58.

EXAMPLE 4

The tropine-phenyl-ether may also be prepared according to the following process: 20.5 g. of tropine-ethane-sulphonate are dissolved in 100 ml. of dimethyl-sulphoxide and the solution obtained is added dropwise to a solution of 17.5 g. of sodium-phenolate and 200 ml. of dimethyl-sulphoxide at 70° C. within an hour. The reaction mixture is kept at 70–80° C. for further 2 hours, whereupon it is cooled and acidified with 20 ml. of concentrated hydrochloric acid, the solvent is removed in vacuo, 100 ml. of water are added to the residue and the unreacted phenol is removed by extracting three times with 50 ml. ether each. The acidic aqueous solution is made alkaline, the tropine-phenyl-ether is extracted with ether and the reaction mixture is worked up according to usual methods. The yield achieved is somewhat lower than that obtained according to Example 3.

EXAMPLE 5

59 g. of sodium-thiophenolate are dissolved in 500 ml. of dimethyl-formamide, whereupon the solution is heated on a water bath and in the meantime a solution of 43.8 g. of tropine-methane-sulphonate and 300 ml. of dimethyl-formamide is added within 2 hours under constant stirring. After the addition having been completed the reaction mixture is heated on a water-bath for a further hour and the precipitated sodium-methane-sulphonate is filtered off. The amount of this product corresponds to the calculated quantity. The filtrate is acidified with 50 ml. of concentrated hydrochloric acid and the mixture is evaporated to dryness in vacuo. (3.5 mm. Hg). The residual slurry is taken up in 130 ml. of water and the mixture is extracted with ether three times in order to remove the unreacted thiophenole. The aqueous solution is worked up as shown in the preceding examples. The tropine-thiophenyl-ether distills of at 130° C./0.6 mm. Hg in the form of a colourless-oil. $n_D^{20} = 1.5798$.

*Analysis.*—Calc. (percent): 72.05; H, 8.12; N, 6.00; S, 13.74. Found (percent): C, 72.27; H, 8.25; N, 6.37; S, 13.45.

The hydrochloride can be prepared in the usual way.

EXAMPLE 6

The 1-methyl-tropine-phenyl-ether may be prepared as follows: 14.1 g. of 1-methyl-tropin-methanesulphonate (M.P. 146° C.) are dissolved in 75 ml. of dimethyl-formamide and the solution is added to a solution of 11.7 g. of sodium-phenolate in dimethylformamide. The reaction-mixture is heated on a water-bath for 3 hours. The precipitated sodium methane-sulphonate (corresponding to the calculated amount) is filtered off, the filtrate is acidified with concentrated hydrochloric acid and evaporated in vacuo (3–5 mm. Hg). The residue is taken up in 30 ml. of water, extracted with ether in order to remove the excess of unreacted phenol and the aqueous layer is saturated with 20 g. of potassium-carbonate under cooling. The precipitated oily ether is extracted three times with 20 ml. ether each, the united ether solutions are dried, the solvent is removed by distillation and the residue is fractionated in vacuo. A colourless oil is obtained at 168° C./10 mm. Hg, $n_D^{20} = 1.5362$.

*Analysis.*—Calc. (percent): C, 41.43; H, 5.12. Found (percent): C, 41.10; H, 5.2.

The reineckate of the product forms pink bright plates melting at 156–158° C. after recrystallization from aqueous acetone.

EXAMPLE 7

N-isopropyl-nortropine-methane-sulphonate is prepared according to the process described in Example 6, except that the crude methane-sulphonate obtained is treated with the methanolic solution of p-toluene-sulphonic acid. Thus the p-toluene-sulphonate of N-isopropyl-nortropine-methane-sulphonate is obtained, which may be crystallized easily and stored conveniently. This salt is readily crystallizable from a mixture of chloroform and methanol, M.P. 180° C.

The above salt is dissolved in water, whereupon the N-isopropyl-nortropine-methane-sulphonate is set free by making the solution alkaline under cooling and the free base is isolated according to usual methods. 49.5 g. of the free base are dissolved in 100 ml. of dimethylformamide and the solution is added dropwise to a solution of 30 g. of sodium-phenolate and 150 ml. of dimethyl-formamide under stirring within an hour at a temperature of about 60° C. The reaction mixture is stirred for a further hour at 80° C. whereupon the precipitated sodium-methane-sulphonate (corresponding almost to the calculated amount) is filtered off, the filtrate is acidified with 30 ml. of concentrated hydrochloric acid and evoporated nearly to dryness. The residue is worked up as described in the preceding examples. The N-isopropyl-nortropine-phenyl-ether is purified by fractionate distillation in vacuo, carried out twice, B.P.: 145–146° C./0.7 mm. Hg $n_D^{20} = 1.5333$. The product is obtained in the form of a yellow oil. The hydrochloride of the product may be obtained according to usual methods. M.P.: 214–215° C. (after crystallization from a mixture of methanol and ether).

EXAMPLE 8

6-methoxy-tropine-methane-sulphonate is prepared from 26.5 g. of 6-methoxy-tropine according to the process described in Example 6. The methane-sulphonate cannot be purified by means of distillation because of the decomposition thereof, thus the methane-sulphonate obtained (39.0 g.) has been directly used for the preparation of the phenyl-ether. The product has been identified by preparing the picrate thereof, M.P. 165–166° C. after recrystallization from ethanol. 37.0 g. of 6-methoxy-tropine-methane-sulphonate obtained are dissolved in 100 ml. of dimethylformamide and the solution is added dropwise to a solution of 25 g. of sodium-phenolate and 200 ml. of dimethyl-formamide within an hour at 70° C. The reaction mixture is kept at 80° C. for a further hour and worked up according to the method described in the preceding examples. The 6-methoxy-tropine-phenyl-ether is distilled twice. At 140–142° C./0.6 mm. Hg a faint yellow oil is obtained. $n_D^{20} = 1.5390$. The free base is dissolved in ethanol and the fumarate is precipitated by adding an equivalent amount of fumaric acid. The melting point of this salt amounts to 185–186° C. after recrystallization from a mixture of ethanol and ether.

EXAMPLE 9

55 g. of tropine-methane-sulphonate are dissolved in 250 ml. of dimethyl-formamide whereupon sodium-cresolate (prepared of 42.2 g. of m-cresol) are added and the reaction mixture is heated at 100° C. for 4 hours. After cooling the precipitated product is filtered off, washed with a small amount of ether and the filtrate is acidified with 15 ml. of a 20% hydrochloric acid solution while cooling with ice. The mixture is evaporated to dryness, the residue is taken up in 150 ml. of water and the unreacted cresol is extracted. The aqueous solution obtained is made alkaline with 35 ml. of a 40% sodium-hydroxyde solution, the precipitated oily tropine-(3-cresyl)-ether is worked up and isolated according to usual methods. B.P.: 120–122° C./0.1 mm. Hg; $n_D^{20} = 1.5340$.

*Analysis.*—Calc. (percent): C, 78.31; H, 9.45; N, 5.71. Found (percent): C, 78.03; H, 9.88; N, 5.81.

A faint yellow oil is obtained. The hydrochloride may be prepared according to usual methods, M.P.: 275° C. (decomposition) after crystallization from ethanol.

EXAMPLE 10

The tropine-(3,5-dimethyl)phenyl-ether is prepared according to the process described in the preceding examples and the base obtained is purified by means of vacuum distillation. B.P.: 129–134° C./0.4 mm. Hg. On cooling the product becomes immediately solid. M.P.: 85° C. (after recrystallization from petrol). The hydrochloride may be prepared in alcohol-ether as medium (M.P.: 274° C., decomposition).

EXAMPLE 11

The tropine-4-chloro-phenyl-ether is prepared according to the method described in the preceding examples. B.P.: 117–118° C./0.08 mm. Hg; $n_D^{20} = 1.5565$. The tropin-ether obtained solidifies quickly on standing, M.P.: 41–43° C. The hydrochloride may be prepared according to usual methods, M.P.: 274° C. (decomposition).

*Analysis.*—Calc. (percent): N, 4.86; Cl. 12.36. Found (percent): N, 4.86; Cl, 12.16.

EXAMPLE 12

36.6 g. of tropine-methane-sulphonate and 40 g. of 3-trifluoro-methyl phenolate are reacted in 200 ml. of dimethyl-formamide and the reaction mixture is worked up according to the method described in the preceding examples. The boiling point of the tropine-3-trifluoro-methyl-phenyl-ether thus obtained amounts to 99–100° C./0.5 mm. Hg, $n_D^{20}$=1.4980.

The hydrochloride of the product may be prepared according to usual methods, M.P.: 253° C. Toxicity on mice=109 mg./kg. subcutaneously and 100 mg./kg. intravenously.

*Analysis.*—Calc. (percent): C, 58.98; H, 5.95. Found (percent): C, 55.56; H, 5.98.

EXAMPLE 13

44.0 g. of tropine-methane-sulphonic acid ester are heated with 48.0 g. of sodium-2,4-dichloro-phenolate in 200 ml. of dimethyl-formamide at 100° C. for 4 hours and the reaction mixture is worked up according to the method described in the preceding examples. The boiling point of the tropine-(2,4-dichloro-phenyl)-ether thus obtained amounts to 15° C./0.25 mm. Hg. The melting point of the hydrochloride was found to be 253° C. (after crystallization from a mixture of alcohol and ether).

EXAMPLE 14

The tropine-(3,4-dichloro-phenyl)-ether may be prepared according to the method described in Example 13, except that sodium-3,4-dichlorophenolate is used as starting material. B.P.: 155–156° C./0.3 mm. Hg, $n_D^{20}$= 1.5670. The hydrochloride of the product may be obtained according to usual methods. M.P.: 255° C.

EXAMPLE 15

55.0 g. of tropine-methane-sulphonic acid ester and 57.9 g. of sodium-pentachloro-phenolate are heated at 100° C. for 4 hours and the reaction mixture is worked up according to the method described in the preceding examples. The tropine-pentachloro-phenyl-ether is a solid product, which melts at 135–136° C. after crystallization from acetone. The melting point of the hydrochloride amounts to 255° C. (decomposition) and this salt is moderately soluble in water.

*Analysis.*—Calc. (percent): C, 39.47; H, 3.55; N, 3.29. Found (percent): C, 39.25; H, 3.40; N, 3.23.

EXAMPLE 16

65.7 g. of tropine-methane-sulphonic acid-ester and 71.4 g. of sodium - 4 - chloro-3,5-dimethyl-phenolate are reacted in 300 ml. of dimethylformamide as described in the preceding examples. The unreacted 4-chloro-3,5-dimethyl-phenol is removed, whereupon a part of the hydrochloride of the tropoine-ether precipitates and is isolated by filtration. The free base is a crystalline product, which melts at 97° C. after crystallization from a mixture of ethanol and petrol. The hydrochloride may be prepared by usual methods and the melting point of the salt amounts to 284° C. (decomposition) after crystallization from ethanol.

*Analysis.*—Calc. (percent): C, 60.76; H, 7.33; N, 4.43; Cl, 11.20. Found (percent): C, 60.54; H, 7.19; N, 4.54; Cl, 11.01.

EXAMPLE 17

3-methyl-4-chloro-phenol is converted into the phenolate by usual methods. 74.8 g. of the product obtained are reacted with 77.0 g. of tropine-methane-sulphonic acid-ester in 350 ml. of dimethylformamide and the reaction mixture is worked up according to the method described in the preceding examples. The boiling-point of the tropine-(4-chloro-3-methyl-phenyl)-ether thus obtained amounts to about 145° C./0.2 mm. Hg. On cooling the product becomes immediately crystalline. M.P.: 82° C. (from benzene). The hydrochloride of the product may be prepared by known methods in a mixture of ethanol and ether as medium. M.P.: 263° C. (decomposition).

*Analysis.*—Calc. (percent): C, 59.60; H, 7.00; N, 4.63. Found (percent): C, 59.42; H, 7.36; N, 4.58.

EXAMPLE 18

2-hydroxy-diphenyl is converted into the corresponding phenolate by means of dehydration carried out in benzene with aqueous sodium-hydroxide. 62.4 g. of the product thus obtained are reacted in 250 ml. of dimethyl-formamide with 55.0 g. of tropine-methane-sulphonic acid-ester and the reaction-mixture is worked up according to the usual method. The tropine - 2 - diphenylyl - ether is a crystalline product which melts at 85° C. after recrystallization from aqueous ethanol. The hydrochloride of the product may be prepared according to usual methods, M.P.: 253° C. (decomposition) after crystallization from a mixture of ethanol and ether.

EXAMPLE 19

104.6 g. of sodium-p-nitro-phenolate are dissolved in 450 ml. of dimethyl-formamide under slight heating whereupon 110.0 g. of tropine-methane-sulphonic acid-ester are added and the reaction mixture is heated on a hot water-bath for 4 hours. The reaction mixture is worked up according to the usual method. Thus tropine-4-nitro-phenyl-ether is obtained in the form of faint yellow crystals. M.P. 105–108° C.

*Analysis.*—Calc. (percent): C, 64.10; H, 6.92; N, 10.68. Found (percent): C, 62.84; H, 6.63; N, 10.36.

The hydrochloride of the product melts at 283° C.

EXAMPLE 20

The tropine-aryl ethers may also be prepared by using potassium-phenolate instead of the sodium-phenolate. Thus e.g. the tropine-phenyl-ether prepared according to Example 3 may also be obtained by slurrying 63.0 g. of potassium-phenolate in 300 ml. of dimethyl-formamide, adding 62.0 g. tropine-methane-sulphonate. The reaction mixture is worked up as described in the preceding examples. Thus 57.5 g. of crude-tropine-phenyl-ether are obtained which is subjected to vacuum-distillation and crystallized from petroleum ether as described in Example 3.

EXAMPLE 21

2.11 g. of the tropline-phenyl-ether prepared according to Examples 3 or 20 are dissolved in 10 ml. of acetone, whereupon the solution is cooled to −20° C. and a solution of 5 ml. of acetone and 1 ml. of liquid methyl-bromide is added. The reaction-mixture is heated in a pressure-bomb-tube at 80° C. for 5 hours. The crude product obtained (2.7 g.) is crystallized from a three-fold amount of hot ethanol. Thus N-methyl-3-phenoxy-tropanium-bromide is obtained. M.P.: 208° C. (decomposition).

*Analysis.*—Calc. (percent): C, 57.69; H, 7.10; N, 4.49; Br, 25.59. Found (percent): C, 57.43; H, 7.59; N, 4.67; Br, 25.63.

EXAMPLE 22

The thio-derivative corresponding to the compound obtained according to Example 21 may be prepared as follows:

6.9 g. of tropine-thiophenyl-ether (prepared according to Example 5) are dissolved in 25.0 ml. of acetone and the solution is heated with a solution of 1.6 ml. of liquid methyl-bromide (liquified by means of cooling to low temperatures) and 5 ml. of acetone at 80° C. for several hours. The melting point of the N-methyl-phenyl-thio-3-tropanium-bromide amounts to 240° C. The product is crystalline and excellently soluble in water.

*Analysis.*—Calc. (percent): C, 54.88; H, 6.76; N, 4.27; S, 9.77; Br, 24.34. Found (percent): C, 54.68; H, 6.55; N, 4.45; S, 9.77; Br, 24.37.

EXAMPLES 23–26

The following compounds are prepared according to the process described in the preceding examples. The physical constants and the analysis data of the products are summarized in the following table:

| Product | | M.P.,° C. | Calculated | | | | Found | | | |
|---|---|---|---|---|---|---|---|---|---|---|
| | | | Cl | C | H | N | Cl | C | H | N |
| Example: | | | | | | | | | | |
| 23 | Tropine-(4'-benzyloxy)-phenylether | 122 | | (78.00) | (7.79) | (4.33) | | 77.78 | 6.91 | 2.90 |
| 23 | Tropine-(4'-benzyloxy)-phenylether. HCl | [1] 253 | (9.85) | (70.08) | (7.28) | (3.89) | 9.58 | 69.52 | 7.62 | 4.17 |
| 24 | 3,5-dichlorophenyltropine-ether | ([2]) | | (54.97) | (6.54) | (5.34) | | 58.50 | 6.32 | 4.64 |
| 24 | 3,5-dichlorophenyltropine-ether. HCl | [1] 267 | (10.99) | (52.11) | (5.62) | (4.34) | 11.68 | 53.00 | 5.99 | 4.29 |
| 25 | Tropine-(3,4,5-trimethyl)-phenylether | 76 | | (78.72) | (9.72) | (5.40) | | 78.81 | 10.05 | 5.66 |
| 25 | Tropine-(3,4,5-trimethyl)-phenylether. HCl | [1] 290 | (11.55) | (69.01) | (8.86) | (4.73) | 11.69 | 69.84 | 8.91 | 4.93 |
| 26 | Tropine-(4-tertiary-butyl)phenylether | ([3]) | | (79.08) | (9.96) | (5.12) | | 79.07 | 10.05 | 5.07 |
| 26 | Tropine-(4-tertiary-butyl)-phenylether. HCl | [1] 290 | (11.44) | (69.76) | (9.11) | (4.52) | 11.16 | 70.06 | 9.42 | 4.71 |

[1] Decomp.   [2] B.P.: 160, 0.4 mm.   [3] B.P. 166, 0.2 mm.

What we claim is:

1. A compound of the general formula

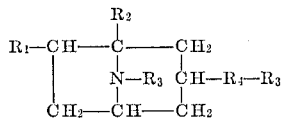

wherein $R_1$ is a member of the group consisting of hydrogen and lower alkoxy;

$R_2$ is hydrogen;

$R_3$ is a member of the group consisting of hydrogen and alkyl containing not more than 4 carbon atoms;

$R_4$ is oxygen;

$R_5$ is a member of the group consisting of phenyl, halogenophenyl, lower alkylphenyl nitrophenyl, aminophenyl, lower alkoxyphenyl and trihalogenomethyl; with a proviso that when $R_5$ is lower alkyl, $R_1$ is other than hydrogen.

2. A compound as claimed in claim 1 except that $R_3$ stands for an alkyl radical containing 1–4 carbon atoms and $R_1$, $R_2$, $R_4$, and $R_5$ have the same meaning as stated above and therapeutically acceptable acid addition salts and lower alkyl quaternary salts thereof.

3. A compound as claimed in claim 1 wherein $R_5$ stands for a phenyl radical optionally substituted by one or more substituents selected from the following group; halogen, trifluoromethy, lower alkyl, lower alkoxy, and hydroxy.

4. A compound selected from the group consisting of: tropine-phenyl-ether,
tropine-thiophenyl-ether,
N-isopropyl-nortropine-phenyl-ether,
6-methoxy-tropine-phenyl-ether,
tropine-(3-cresyl)-ether,
tropine-(3,5-dimethyl-phenyl)-ether,
tropine-(4-chloro-phenyl)-ether,
tropine-(3-trifluoromethylphenyl)-ether,
tropline-(2,4-dichloro-phenyl)-ether,
tropine-(3,4-dichloro-phenyl)-ether,
tropine-pentachloro-phenyl-ether,
tropine-(4-chloro-3,5-dimethyl-phenyl)-ether,
tropine-(3-methyl-4-chlorophenyl)-ether,
tropine-4-nitro-phenyl-ether,
tropine-(4'-benzyl-oxy)-phenyl-ether,
tropine-(3,5-dichloro-phenyl)-ether,
tropine-(3,4,5-trimethyl-phenyl)-ether,
tropine-(4-tertiary-butyl)-phenyl-ether,
and pharmaceutically acceptable acid addition salts thereof and lower alkyl quaternary salts thereof containing 1–4 carbon atoms.

References Cited

UNITED STATES PATENTS 3,351,625   11/1967   Harms _____ 260—292

FOREIGN PATENTS 106,492   6/1896   Germany.

ALAN L. ROTMAN, Primary Examiner

U.S. Cl. X.R.

424—265